US008327964B2

(12) United States Patent
Inaoka et al.

(10) Patent No.: US 8,327,964 B2
(45) Date of Patent: Dec. 11, 2012

(54) ARRANGEMENT OF CANISTER IN SADDLE-RIDING TYPE VEHICLE

(75) Inventors: Hiroshi Inaoka, Wako (JP); Takeshi Shimura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 336 days.

(21) Appl. No.: 12/726,135

(22) Filed: Mar. 17, 2010

(65) Prior Publication Data

US 2010/0243353 A1   Sep. 30, 2010

(30) Foreign Application Priority Data

Mar. 27, 2009   (JP) ................................. 2009-078981

(51) Int. Cl.
*B62K 11/00* (2006.01)
(52) U.S. Cl. ....................................... 180/219; 123/519
(58) Field of Classification Search .................. 180/219; 123/519
See application file for complete search history.

(56) References Cited

U.S. PATENT DOCUMENTS

| 8,113,312 | B2 * | 2/2012 | Seki et al. ..................... 180/225 |
| 2010/0224172 | A1 * | 9/2010 | Kusa .............................. 123/520 |
| 2010/0243358 | A1 * | 9/2010 | Suzuki ........................... 180/219 |
| 2011/0024214 | A1 * | 2/2011 | Seki et al. ..................... 180/69.4 |
| 2011/0073063 | A1 * | 3/2011 | Tadokoro et al. ........... 123/195 C |
| 2011/0240392 | A1 * | 10/2011 | Iwata et al. .................... 180/229 |

FOREIGN PATENT DOCUMENTS

JP   04-353257 A   12/1992

* cited by examiner

*Primary Examiner* — Kevin Hurley
(74) *Attorney, Agent, or Firm* — Westerman, Hattori, Daniels & Adrian, LLP

(57) ABSTRACT

A canister is provided which efficiently purges in a saddle-riding type vehicle having an engine disposed downwardly of a rider seat so as to develop a drive power for driving a rear wheel, a fuel tank storing fuel to be supplied to the engine, and a canister adsorbing fuel vapors generated in the fuel tank. An air guide path that guides exhaust air discharged rearwardly from a radiator, which circulates coolant with an engine, is formed inside a vehicle body cover. The canister is disposed in the air guide path.

6 Claims, 4 Drawing Sheets

ARRANGEMENT OF CANISTER IN SADDLE-RIDING TYPE VEHICLE

TECHNICAL FIELD

A saddle-riding type vehicle has an engine disposed downwardly of a rider seat so as to develop a drive power for driving a rear wheel, a fuel tank storing fuel to be supplied to the engine, and a canister adsorbing fuel vapors generated in the fuel tank. An improved arrangement of the canister is disclosed.

BACKGROUND OF THE INVENTION

Japanese Patent Laid-open No. Hei 4-353257 discloses a scooter type vehicle, in which a canister that adsorbs fuel vapors generated in a fuel tank is disposed rearward of a helmet storage box disposed downward of a rider seat and displaced in a vehicle width direction from an upper portion of a rear cushion.

SUMMARY OF THE INVENTION

Fuel adsorbed by the canister is evaporated and purged while the engine is running. There is a need for achieving an arrangement of the canister that permits efficient purging.

An arrangement of a canister in a saddle-riding type vehicle is provided that allows purging from the canister to be performed more efficiently.

A canister is arranged in a saddle-riding type vehicle. The saddle-riding type vehicle includes an engine disposed downward of a rider seat so as to develop a drive power for driving a rear wheel; a fuel tank storing fuel to be supplied to the engine; and a canister adsorbing fuel vapors generated in the fuel tank. The arrangement includes an air guide path disposed inside a vehicle body cover, the air guide path guiding exhaust air discharged rearwardly from a radiator that circulates coolant with the engine and is characterized in that the canister is disposed in the air guide path.

Additionally, the air guide path is disposed inside a vehicle body cover having a footrest portion on which a rider sitting on the rider seat rests his or her foot.

Additionally, the fuel tank is disposed rearward of the radiator, the radiator is disposed downward of a front portion of the footrest portion; and the canister is disposed in a recessed portion which is disposed at a lower portion on a front side of the fuel tank.

Additionally, the saddle-riding type vehicle further has a vehicle body frame supporting the engine. The vehicle body frame includes a head pipe disposed at a front end of the vehicle body frame; a pair of left and right lower down frames, each of the lower down frames being formed to integrate in a connected row arrangement a front half portion, connected in a row arrangement to the head pipe and extending downwardly toward a rear, and a rear half portion extending horizontally toward the rear from a lower end portion of the front half portion; and a cross member connecting lower portions of the front half portions. The canister disposed rearward of the cross member is fixed and supported on a stay fixedly attached to the cross member, so as to be disposed upward of a lowermost portion of the cross member and covered by the stay from a downward direction.

According to the first characteristic, the air guide path guiding the exhaust air discharged rearwardly from the radiator is formed in the vehicle body cover and the canister is disposed in the air guide path. The exhaust air discharged from the radiator therefore blows against the canister while the engine is running to thereby adequately heat the canister. This enables efficient purging from the canister.

According to the second characteristic, a portion at which the footrest portion is formed is set to a low level. A relatively narrow air guide path is therefore formed inside the vehicle body cover, so that the exhaust air discharged from the radiator can be concentrated as it flows through the air guide path. This allows the canister to be heated effectively.

According to the third characteristic, the canister is disposed downward of the fuel tank where temperature is relatively stable, so that fuel vapors can be more easily stored in the canister while the engine is stationary.

According to the fourth characteristic, the canister is fixed and supported on the stay that is fixedly attached to the cross member disposed forward and downward of the canister, such that the canister is covered by the stay from a downward direction. This eliminates the need for a special protective member for protecting the canister.

BRIEF DESCRIPTION OF THE DRAWINGS

The advantages of the invention will become apparent in the following description taken in conjunction with the drawings, wherein.

DETAILED DESCRIPTION OF THE INVENTION

A specific embodiment to which the present invention is applied will be described below with reference to the accompanying drawings.

Figure 1:
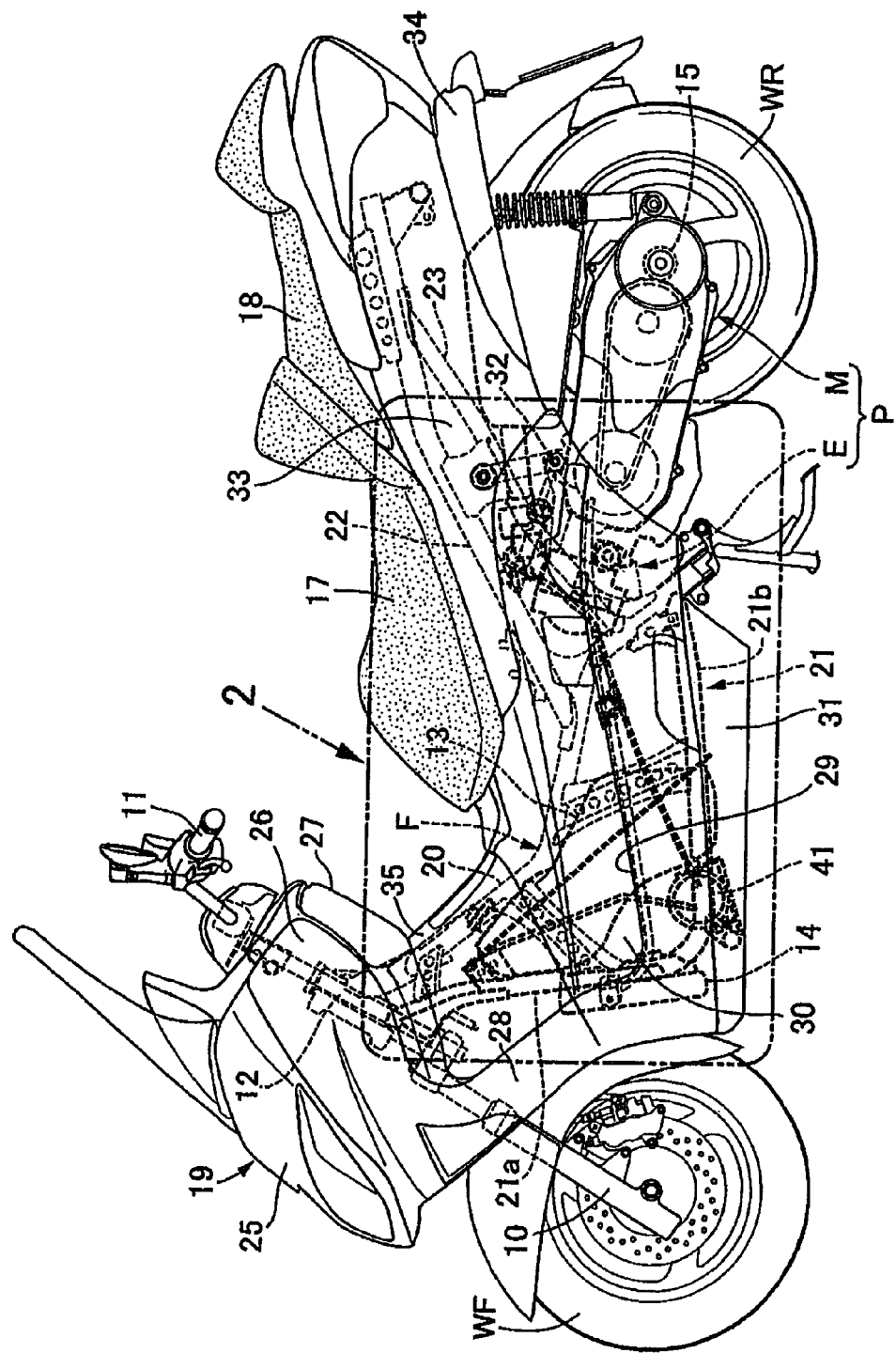
FIG. 1 is a partly cutaway left side elevational view showing a scooter type vehicle.

A first embodiment of the present invention will be described below with reference to FIGS. 1 through 4. Referring first to FIG. 1, a scooter type vehicle as a saddle-riding type vehicle includes a vehicle body frame F. The vehicle body frame F includes a head pipe 12 disposed at a front end thereof. The head pipe 12 supports removably a front fork 10 that journals a front wheel WF and steerably a steering handlebar 11 connected to the front fork 10. A power unit P having a rear end supporting an axle 15 of a rear wheel WR is vertically swingably supported removably at an intermediate portion in a longitudinal direction of the vehicle body frame F. A fuel tank 13 and a radiator 14 are mounted on the vehicle body frame F forward of the power unit P. The fuel tank 13 is formed to be vertically long in a side view. The radiator 14 is disposed forward of the fuel tank 13. A rider seat 17 and a passenger seat 18 disposed rearward of the rider seat 17 are disposed at a rear portion of the vehicle body frame F. In addition, the vehicle body frame F is mounted with a vehicle body cover 19 formed from a synthetic resin, covering the vehicle body frame F, a front portion of the power unit P, the fuel tank 13, and the radiator 14.

Figure 2:
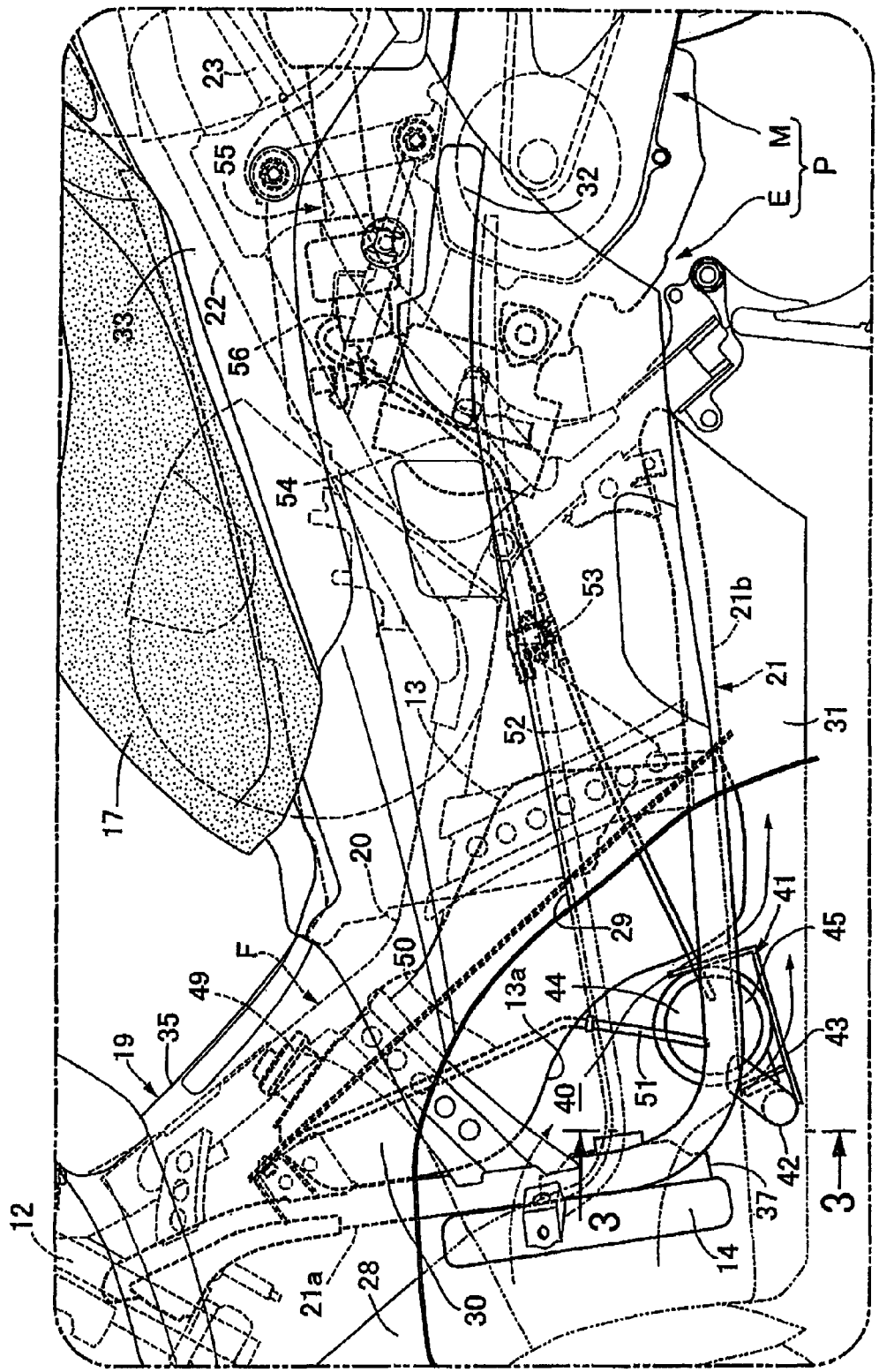
FIG. 2 is an enlarged view on arrow 2 of FIG. 1.

Referring also to FIG. 2, the vehicle body frame F includes the head pipe 12, a pair of left and right upper down frames 20, a pair of left and right lower down frames 21, a pair of left and right seat rails 22, and a pair of left and right rear frames 23. More specifically, the upper down frames 20 are connected in a row arrangement to the head pipe 12 and extend downwardly toward the rear. Each of the lower down frames 21 is formed to integrate in a connected row arrangement a front half portion 21a, connected in a row arrangement to the head pipe 12 at a point lower than the upper down frames 20 and extending downwardly toward the rear, and a rear half portion 21b extending horizontally toward the rear. The lower down frames 21 have rear ends welded to rear end portions of the upper down frames 20. The seat rails 22 extend upwardly toward the rear from intermediate portions of the upper down frames 20. The rear frames 23 connect between rear portions of the upper down frames 20 and rear portions of the seat rails 22.

The vehicle body cover 19 includes a front cover 25, a pair of left and right front side covers 26, an inner cover 27, leg shields 28, a pair of left and right floor center covers 30, a pair of left and right floor side covers 31, a pair of left and right passenger steps 32, a pair of left and right body side covers 33, and a rear lower cover 34. Specifically, the front cover 25 covers a front portion of the head pipe 12 and an upper portion of the front wheel WF. The front side covers 26 are joined to left and right sides of the front cover 25. The inner cover 27 is continuous with the front side covers 26 so as to cover the head pipe 12 from a rearward side thereof. The leg shields 28 are joined to both front side covers 26 and the inner cover 27 so as to cover a front leg portion of a rider sitting on the rider seat 17. The floor center covers 30 extend rearwardly continuously from the leg shields 28 and form, with lower end portions thereof, footrest portions 29 on which the rider rests his or her feet. The floor side covers 31 droop downwardly from outer edges of the footrest portions 29. The passenger steps 32 are disposed at rear portions of the footrest portions 29. The body side covers 33 are disposed downward of both sides of the rider seat 17 and the passenger seat 18 and are connected in a row arrangement to the floor side covers 31 to extend rearwardly. The rear lower cover 34 is connected in row arrangement to lower portions on a rearward side of the body side covers 33. In addition, a floor tunnel portion 35 is formed from the rear of the head pipe 12 to a front downward portion of the rider seat 17. The floor tunnel portion 35 ridges upwardly between the footrest portions 29 with part of the leg shields 28 and the floor center covers 30 and stores therein the fuel tank 13 and the radiator 14.

The power unit P is formed to include an engine E and a transmission system M. Specifically, the engine E of a water-cooled type is disposed forward of the rear wheel WR. The transmission system M includes a V-belt type continuously variable transmission and a reduction gear train (not shown) reduces a speed of an output from the continuously variable transmission and transmits a resultant output to the axle 15 of the rear wheel WR. The transmission system M is disposed on the left side of the rear wheel WR.

The radiator 14 that circulates coolant with the engine E of the power unit P is supported between the front half portions 21a of the lower down frames 21 in the vehicle body frame F and is disposed downward of front portions of the footrest portions 29 in the vehicle body cover 19. A radiator fan 37 discharging air that has passed through the radiator 14 is annexed to a rear surface of the radiator 14. An air guide path 40 that guides exhaust air discharged rearwardly from the radiator 14 is formed inside the vehicle body cover 19 between the floor center covers 30 and between the floor side covers 31 in the vehicle body cover 19. A canister 41 that adsorbs fuel vapors generated in the fuel tank 13 is disposed in the air guide path 40 so as to be located between the radiator 14 and a lower portion of the fuel tank 13.

Figure 3:
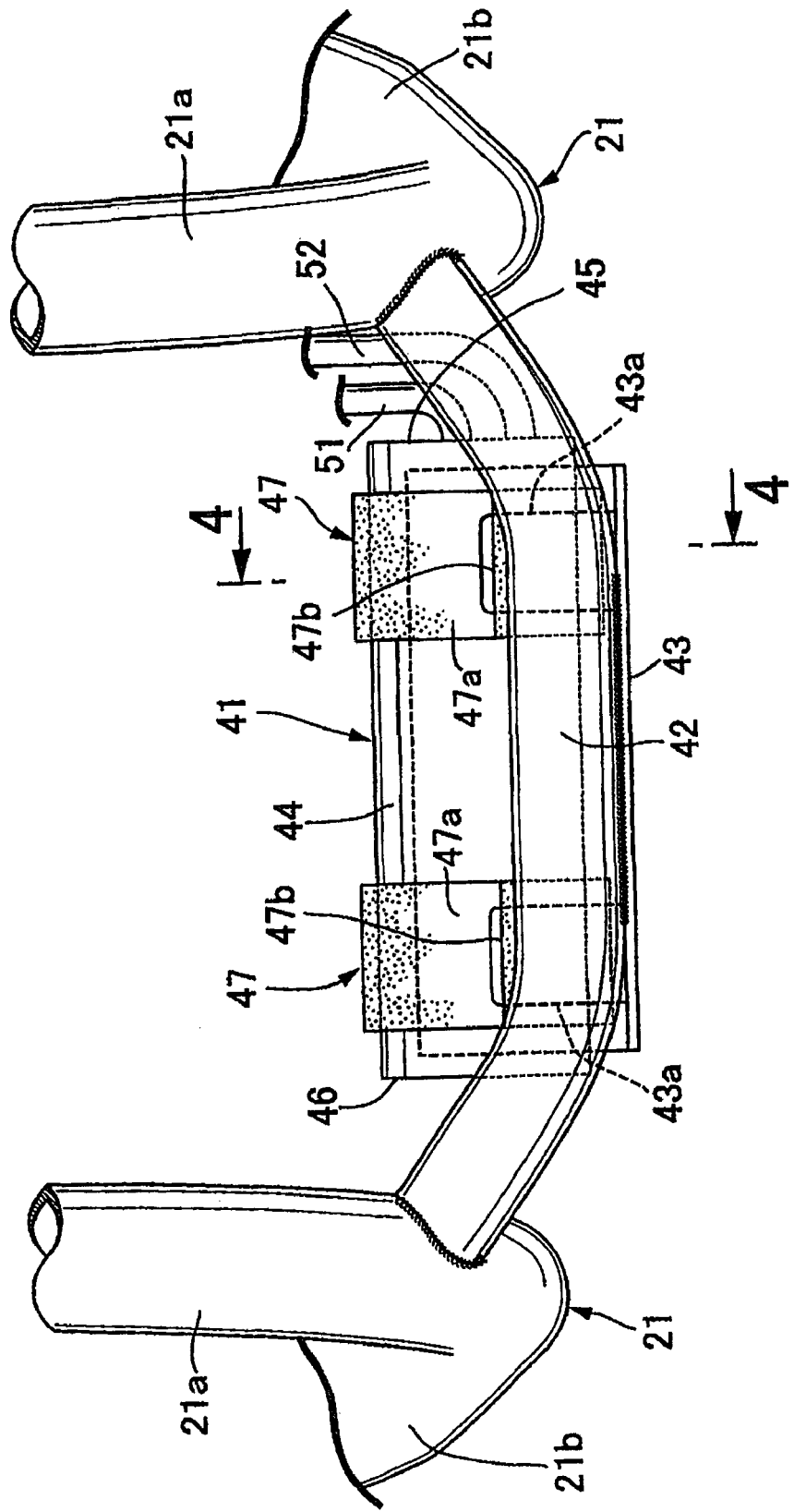
FIG. 3 is a view on arrows 3 of FIG. 2.
Figure 4:
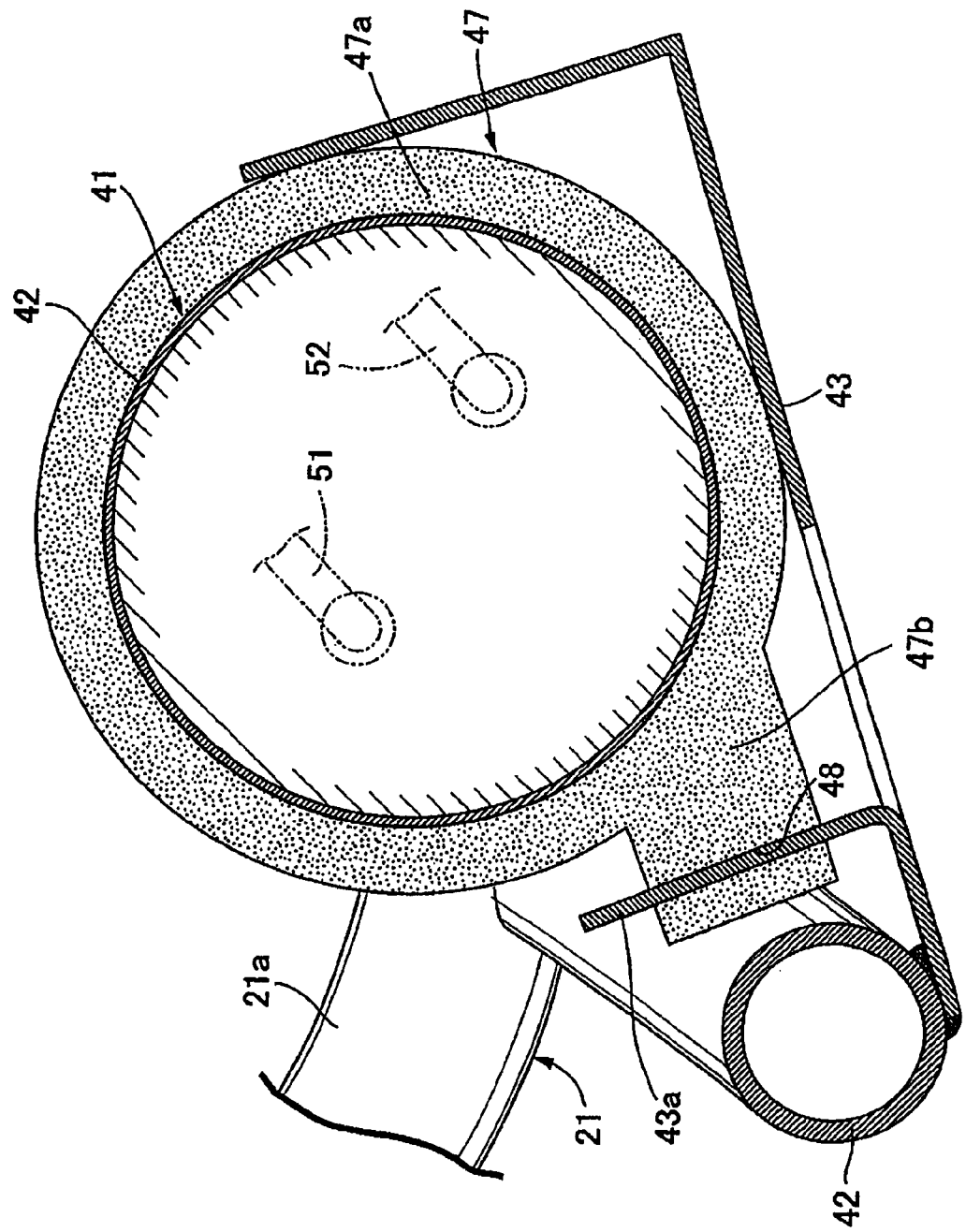
FIG. 4 is a cross-sectional view taken along line 4-4 of FIG. 3.

Referring also to FIGS. 3 and 4, a cross member 42 is disposed between the front half portions 21a in the lower down frames 21 of the vehicle body frame F. The canister 41 is fixed and supported by a stay 43 fixedly attached to the cross member 42.

A case 44 of the canister 41 is formed into a cylinder extending in the vehicle width direction and having both ends closed by end walls 45, 46. The case 44 of the canister 41 includes a pair of engagement members 47. The engagement members 47 are engaged with a pair of lock tabs 43a disposed on the stay 43, which results in the canister 41 being fixed and supported on the stay 43. The canister 41 fixed and supported on the stay 43 is then disposed upward of a lowermost portion of the cross member 42 and covered by the stay 43 from a downward direction.

Each of the engagement members 47 is formed of an elastic material, for example, rubber, integrating an annular portion 47a and an engagement protrusion portion 47b protruding outwardly from the annular portion 47a. The annular portion 47a is resiliently mounted on an outer periphery of the case 44 in the canister 41. The engagement protrusion portion 47b includes an engagement hole 48 formed therein. An upper portion of the lock tab 43a is passed through and engaged with the engagement hole 48.

The fuel tank 13 includes a recessed portion 13a disposed at a lower portion on the front side thereof. The recessed portion 13a is open forwardly and downwardly. The canister 41 is disposed inside the recessed portion 13a. The recessed portion 13a has an upper surface that bulges upwardly and is then inclined downwardly toward the rear. The exhaust air discharged from the radiator 14 and the radiator fan 37 is guided by the upper surface of the recessed portion 13a effectively toward the side of the canister 41.

A fuel filler port closed by a filler cap 49 is disposed at an upper portion of the fuel tank 13. A charge pipe 50 made of metal having a first end open in the fuel tank 13 at a position near the fuel filler port extends vertically inside the fuel tank 13 and is fixed in the fuel tank 13 so as to have a second end facing the recessed portion 13a. A charge hose 51 for deriving fuel vapors generated inside fuel tank 13 has a first end portion connected to the second end of the charge pipe 50. In addition, the charge hose 51 has a second end connected to the end wall 45 on the left-hand side of the two end walls 45, 46 of the case 44 in the canister 41. This allows the fuel vapors generated in the fuel tank 13 to be trapped by the canister 41.

Additionally, a first purge hose 52 for drawing the fuel vapors trapped by the canister 41 has a first end portion connected to the end wall 45 on the left-hand side. The first purge hose 52 has a second end portion connected to a purge control valve 53 supported by the vehicle body frame F at a position forward of the engine E. The purge control valve 53 is closed when the engine E remains cold or during an idle operation and opens when the engine E is hot. A second purge hose 54 having a first end portion connected to the purge control valve 53 is connected to an intake pipe 56 in an intake system 55 of the engine E. Consequently, the fuel vapors trapped by the canister 41 are drawn from the canister 41 by vacuum in the intake system 55 when the engine E is hot and supplied to the engine E from the intake pipe 56 of the intake system 55 via the first purge hose 52, the purge control valve 53, and the second purge hose 54.

A pressure release tube (not shown) for making the canister 41 open to the atmosphere and a drain tube (not shown) for discharging drain from the canister 41 are connected to the end wall 46 on the right-hand side of the two end walls 45, 46 of the case 44 in the canister 41.

Effects of the first embodiment of the present invention will be described below. The air guide path 40 guiding the exhaust air discharged rearwardly from the radiator 14 that circulates coolant with the engine E of the power unit P is formed in the vehicle body cover 19. The canister 41 adsorbing the fuel vapors generated in the fuel tank 13 is disposed in the air guide path 40. The exhaust air discharged from the radiator 14 therefore blows against the canister 41 while the power unit P is operating to thereby adequately heat the canister 41. This enables efficient purging from the canister 41.

In addition, the vehicle body cover 19 has the footrest portions 29 on which the rider sitting on the rider seat 17 rests his or her feet. The portions at which the footrest portions 29 are formed are set to a low level. A relatively narrow air guide path 40 is therefore formed inside the vehicle body cover 19, so that the exhaust air discharged from the radiator 14 can be concentrated as it flows through the air guide path 40. This allows the canister 41 to be heated effectively.

Additionally, the radiator 14 is disposed at the front portion downward of the footrest portions 29 disposed on the vehicle body cover 19, the fuel tank 13 is disposed rearward of the radiator 14, and the canister 41 is disposed in the recessed portion 13a disposed at the front lower portion of the fuel tank 13. This results in the canister 41 being disposed downward of the fuel tank 13, the temperature of which is relatively stabilized, so that fuel vapors can be more easily stored in the canister 41 while the engine E is stationary.

Further, each of the left and right lower down frames 21 forming part of the vehicle body frame F is formed to integrate in a connected row arrangement the front half portion 21a, which is connected in a row arrangement to the head pipe 12 at the front end of the vehicle body frame F and extending downwardly toward the rear, and the rear half portion 21b, which extends horizontally toward the rear from the lower end portion of the front half portion 21a. The canister 41 is disposed rearward of the cross member 42 connecting the lower portions of the front half portions 21a in the lower down frames 21. The canister 41 is fixed and supported on the stay 43 fixedly attached to the cross member 42 so as to be disposed upward of the lowermost portion of the cross member 42 and covered by the stay 43 from a downward direction. This eliminates the need for a special protective member for protecting the canister 41.

While the present invention has been particularly shown and described with reference to a preferred embodiment, it should be understood that the present invention is not limited to the disclosed embodiment. It will be understood by those skilled in the art that various changes in form and detail may be made therein without departing from the spirit and scope of the invention.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

We claim:

1. An saddle-riding type vehicle, comprising:
   an engine disposed downward of a rider seat;
   a vehicle body cover;
   a radiator which circulates coolant with said engine;
   a fuel tank storing fuel to be supplied to said engine;
   a canister adsorbing fuel vapors generated in said fuel tank; and
   an air guide path disposed inside said vehicle body cover, said air guide path guiding exhaust air discharged rearwardly from said radiator,
   wherein said canister is disposed in said air guide path.

2. The vehicle according to claim 1, wherein said vehicle body cover includes a footrest portion on which a rider sitting on the rider seat rests his or her foot.

3. The vehicle according to claim 2,
   wherein said fuel tank is disposed rearward of said radiator,
   wherein said radiator is disposed downward of a front portion of said footrest portion, and
   wherein said canister is disposed in a recessed portion of said fuel tank, said recessed portion being disposed at a lower portion on a front side of said fuel tank.

4. The vehicle according to claim 1, further comprising:
   a vehicle body frame supporting said engine, said vehicle body frame including
      a head pipe disposed at a front end of said vehicle body frame;
      a pair of left and right lower down frames, each of said lower down frames including a front half portion connected to said head pipe and extending downwardly toward a vehicle rear and a rear half portion extending horizontally toward the vehicle rear from a lower end portion of said front half portion; and
      a cross member between lower portions of said front half portions,
   wherein said canister is disposed rearward of said cross member,
   wherein said canister is fixed and supported on a stay fixedly attached to said cross member,
   wherein said canister is disposed upward of a lowermost portion of said cross member, and
   wherein said canister is covered by said stay from a downward direction.

5. The vehicle according to claim 2, further comprising:
   a vehicle body frame supporting said engine, said vehicle body frame including
      a head pipe disposed at a front end of said vehicle body frame;
      a pair of left and right lower down frames, each of said lower down frames including a front half portion connected to said head pipe and extending downwardly toward a vehicle rear and a rear half portion extending horizontally toward the vehicle rear from a lower end portion of said front half portion; and
      a cross member between lower portions of said front half portions,
   wherein said canister is disposed rearward of said cross member,
   wherein said canister is fixed and supported on a stay fixedly attached to said cross member,
   wherein said canister is disposed upward of a lowermost portion of said cross member, and
   wherein said canister is covered by said stay from a downward direction.

6. The vehicle according to claim 3, further comprising:
   a vehicle body frame supporting said engine, said vehicle body frame including
      a head pipe disposed at a front end of said vehicle body frame;
      a pair of left and right lower down frames, each of said lower down frames including a front half portion connected to said head pipe and extending downwardly toward a vehicle rear and a rear half portion extending horizontally toward the vehicle rear from a lower end portion of said front half portion; and
      a cross member between lower portions of said front half portions,
   wherein said canister is disposed rearward of said cross member,
   wherein said canister is fixed and supported on a stay fixedly attached to said cross member,
   wherein said canister is disposed upward of a lowermost portion of said cross member, and
   wherein said canister is covered by said stay from a downward direction.

* * * * *